(12) United States Patent
Bloomquist et al.

(10) Patent No.: US 7,089,503 B1
(45) Date of Patent: Aug. 8, 2006

(54) MORTGAGE LOAN CUSTOMIZATION SYSTEM AND PROCESS

(75) Inventors: Eric Bloomquist, Arlington, VA (US); Robert Spellman, Fairfax, VA (US); Barbara Joan Wilson, Rockville, MD (US)

(73) Assignee: Fannie Mae, Washington, DC (US)

( * ) Notice: Subject to any disclaimer, the term of this patent is extended or adjusted under 35 U.S.C. 154(b) by 405 days.

(21) Appl. No.: 10/115,569

(22) Filed: Apr. 3, 2002

Related U.S. Application Data

(60) Provisional application No. 60/281,377, filed on Apr. 4, 2001.

(51) Int. Cl.
G06F 17/60 (2006.01)
G06Q 40/00 (2006.01)

(52) U.S. Cl. .................................. 715/780; 705/38
(58) Field of Classification Search ............... 345/780, 345/744–747, 772, 748–749; 707/3, 10; 705/30–45, 38, 400–410, 10, 26; 715/780, 715/773, 965, 747
See application file for complete search history.

(56) References Cited

U.S. PATENT DOCUMENTS

| | | | | |
|---|---|---|---|---|
| 5,940,812 A | * | 8/1999 | Tengel et al. ............... 705/38 |
| 5,966,699 A | * | 10/1999 | Zandi ......................... 705/38 |
| 5,970,478 A | | 10/1999 | Walker et al. |
| 5,987,500 A | * | 11/1999 | Arunachalam ............... 709/203 |
| 6,233,566 B1 | * | 5/2001 | Levine et al. ................ 705/37 |
| 6,249,775 B1 | * | 6/2001 | Freeman et al. ........... 705/36 R |
| 6,438,526 B1 | * | 8/2002 | Dykes et al. ................ 705/38 |
| 6,567,805 B1 | * | 5/2003 | Johnson et al. ............... 707/5 |
| 6,684,196 B1 | * | 1/2004 | Mini et al. .................... 705/26 |
| 6,823,319 B1 | * | 11/2004 | Lynch et al. ................. 705/38 |
| 2002/0059137 A1 | * | 5/2002 | Freeman et al. ............. 705/38 |
| 2002/0123960 A1 | * | 9/2002 | Ericksen ...................... 705/38 |
| 2002/0169715 A1 | * | 11/2002 | Ruth et al. ................... 705/40 |
| 2004/0002915 A1 | * | 1/2004 | McDonald et al. ........... 705/38 |
| 2004/0019558 A1 | * | 1/2004 | McDonald et al. ........... 705/38 |
| 2006/0080202 A1 | * | 4/2006 | Ireland et al. ............... 705/35 |

FOREIGN PATENT DOCUMENTS

WO      WO 02/29517      *   4/2002

OTHER PUBLICATIONS

Awad, "The Structure of E-Commerce in the Banking Industry: An Empirical Investigation," SIGCPR 2000, Evanston, Il. pp. 144-150.*

* cited by examiner

Primary Examiner—Steven P. Sax
(74) Attorney, Agent, or Firm—Foley & Lardner LLP

(57) ABSTRACT

A computerized mortgage loan system and process to enable borrowers to design mortgage loans that meet their particular individual needs and financial goals, and that can be adapted to fit changing needs and goals is provided. The loan requirements of the borrower are obtained and applied to a set of rules for combining loan product features. One or more loan recommendations are determined and presented to the borrower. The loan recommendations include customized combinations of loan features based on the loan requirements of the borrower and the rules.

31 Claims, 10 Drawing Sheets

FIG. 5

+ denotes a required field

Customer Information

| +Last Name | | +First Name | | M.I | |
| +Street 1 | | | | | |
| Street 2 | | | | | |
| +City | | +State | State Selection ▼ | +Zip Code | ☐ - ☐ |
| +Phone 1 | | Ext | | | |
| Phone 2 | | Ext | | | |
| +SSN | | +EMail | | | |

Property Information

+Street 1
Street 2

FIG. 7

Design your loan by selecting the features you want to include

Loan Terms

Payment Frequency [Bi-Weekly ▶]   Payment Date [Unavailable ▶]   Auto Draft Payment [Yes ▶]

Term

Amortization [300] Months       Maturity [300] Months

☐ Graduated Payment Plan

Initial Payment Rate [ ]   Payment Increase % [ ]   Number of Increases [ ]

First [12] Months

How many? [One ▶]   Month-1 [SEP ▶]   Month-2 [Unavailable ▶]

☑ Interest Only
☑ Scheduled Skipped
   Payments
☑ Portable
☐ Assumable
☐ Convertible
☐ HELOC         HELOC CLTV % [ ]
☐ Unscheduled Skipped Payments

FIG. 8

| | GPM at Interest Only; increasing 4% for 5 years; Less than 12 payments; 30 year amortization; monthly payments | Interest Only for 2 years; curtailments; 28 year amortization; monthly payments | Less than 12 payments; 25 year amortization, monthly payments | 30 year amortization; monthly payments |
|---|---|---|---|---|
| Interest Rate | 9.85% | 8.75% | 8.97% | 8.69% |
| True Cost Rate | 11.13% | 9.89% | 10.14% | 9.82% |
| Initial Payment | $2,482.20 | $1,837.50 | $2,535.52 | $1971.70 |
| Maximum Payment | $2,903.83 | $1,972.80 | $2,535.52 | $1971.70 |
| Maturity Date | 15 | 30 | 25 | 30 |
| | Loan Details | Loan Details | Loan Details | Loan Details |

FIG. 9

Welcome

The Find a Loan tool allows you to create a loan that is customized to your needs.

Here is how it works.

- First we need to collect some basic information. We will ask you to indicate some goals you have for your loan.

- Using this information we will review the available loan features and come back with a second set of questions that will help us get a loan solution that is just right for you.

- After you have answered these questions, we will show you a set of loan feature combinations that we think will best meet your stated needs. We will also show you a standard product for comparison. For each of these solutions, we will give you the ability to graphically look at the cash flow and the amortization profile.

- If you see something you like, let us know and we can move on to the next stage - Applying for the Loan. If you aren't happy with what you see, you can go back and change your goals until you find something you like.

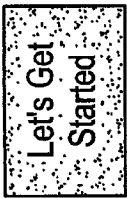

Let's Get Started

MORTGAGE LOAN CUSTOMIZATION SYSTEM AND PROCESS

CROSS REFERENCE TO RELATED PROVISIONAL APPLICATION

This application claims the benefit of U.S. Provisional Patent Application No. 60/281,377 filed on Apr. 4, 2001, the disclosure of which is incorporated by reference in its entirety.

BACKGROUND OF THE INVENTION

The present invention relates generally to a computerized mortgage system and process that permit potential borrowers to customize mortgage loans to meet their changing needs and different financial goals.

When considering the purchase or refinance of a home, potential home buyers consult mortgage lenders such as mortgage companies, savings and loans institutions, credit unions, state and local housing finance agencies or the like to obtain the finds necessary to purchase or refinance their homes. These lenders, who make (originate and fund) mortgage loans directly to home buyers, comprise the "primary mortgage market."

When a mortgage is made in the primary mortgage market, the lender has several options which include: (i) holding the loan as an investment in its portfolio; (ii) selling the loan to investors in the "secondary mortgage market" (which includes government-sponsored entities, pension finds, insurance companies, securities dealers, financial institutions and various other investors) to replenish its supply of finds; or (iii) packaging the loan with other loans and exchanging them for securities like mortgage backed securities which provide lenders with a liquid asset to hold or sell to the secondary market. By choosing to sell its mortgage loans to the secondary mortgage market, or by selling the mortgage backed securities, lenders get a new supply of funds to make more home mortgage loans, thereby assuring home buyers a continual supply of mortgage credit.

A secondary mortgage market purchaser finances the loans and mortgage backed securities it buys for its own mortgage portfolio by the sale of debt securities in the global capital markets. Working with investment banks, the purchaser sells its debt to both domestic and international investors such as central banks, pension funds, investment funds, commercial banks and insurance companies.

Lenders compete in the primary mortgage market by offering and advertising various mortgage products typically having predetermined or "pre-packaged" features. This "one-size-fits-all" approach to mortgage loans has been both a source of missed opportunities for lenders and discouragement for borrowers.

SUMMARY OF THE INVENTION

The computerized mortgage loan system and process in accordance with the present invention avoids the disadvantages to both lenders and borrowers associated with "one-size-fits-all" mortgage products. Generally speaking, the method and system according to the present invention enables borrowers to design a mortgage loan that is customized to meet the individual requirements and financial goals of the borrower, and that can be adapted to fit changing needs and goals.

The preferred method according to the present invention involves obtaining the loan requirements (e.g., needs, financial goals, desired loan features) of the borrower, applying the loan requirements to a set of rules for combining loan product features, and determining one or more loan recommendations for presentation to the borrower which include a customized combination of loan features based on the loan requirements of the borrower and the rules. The preferred system according to the present invention provides means for effecting the foregoing preferred process steps.

Other aspects and advantages of the invention will in part be obvious and will in part be apparent from the specification.

The present invention accordingly comprises the various steps and the relation of one or more of such steps with respect to each of the others, and the system embodies features of construction, combinations of elements, and arrangement of parts which are adapted to effect such steps, all as exemplified in the following detailed disclosure, and the scope of the invention will be indicated in the claims.

BRIEF DESCRIPTION OF THE DRAWINGS

For a fuller understanding of the invention, reference is had to the following description taken in connection with the accompanying drawings in which.

DETAILED DESCRIPTION OF THE PREFERRED EMBODIMENTS

In the primary mortgage market, lenders compete by offering and advertising various mortgage products typically having "pre-packaged" combinations of interest rates and points, mortgage terms, etc. Lenders work largely within the constraints of this predetermined range of product differentiation in combination with traditional advertising to distinguish their mortgage products from those of their competitors.

This "one-size-fits-all" approach to mortgage loans has its disadvantages from the perspective of both the lender and the borrower. Typically, if a potential borrower qualifies for a pre-packaged mortgage loan from a prime lender, the borrower will get the loan; if a borrower does not qualify, the prime lender cannot help the borrower. Rejected by the prime lender, the potential borrower would then have to go to a subprime lender and pay a significantly higher interest rate on a mortgage loan.

The method and system according to the present invention avoids the disadvantages and constraints to both lenders and borrowers associated with "one-size-fits-all" mortgage products by enabling borrowers to design a mortgage loan that is customized to fit their individual needs and financial goals, and that can be adapted to fit changing needs and goals. The inventive system and process can be provided in real time over a global computer network, such as, for example, the Internet.

Although discussed herein in the context of mortgage loans, it should be understood that the present invention is not limited to mortgage loans, but has application with respect to other types of loans. It will be further understood that the present invention is not concerned with the conventional mortgage broker model whereby a borrower's mortgage loan application is "shopped" to scores of lenders with whom the broker does business, and the borrower is presented with a menu of pre-packaged mortgage products offered by such lenders that approximate the borrower's requirements.

The system and process according to the present invention can be implemented using a related combination of automated interfaces and manual processes. It should be appreciated, however, that greater use of automated processing and a wider range of product features with multiple executions and elections is also contemplated by the present invention.

Figure 1:
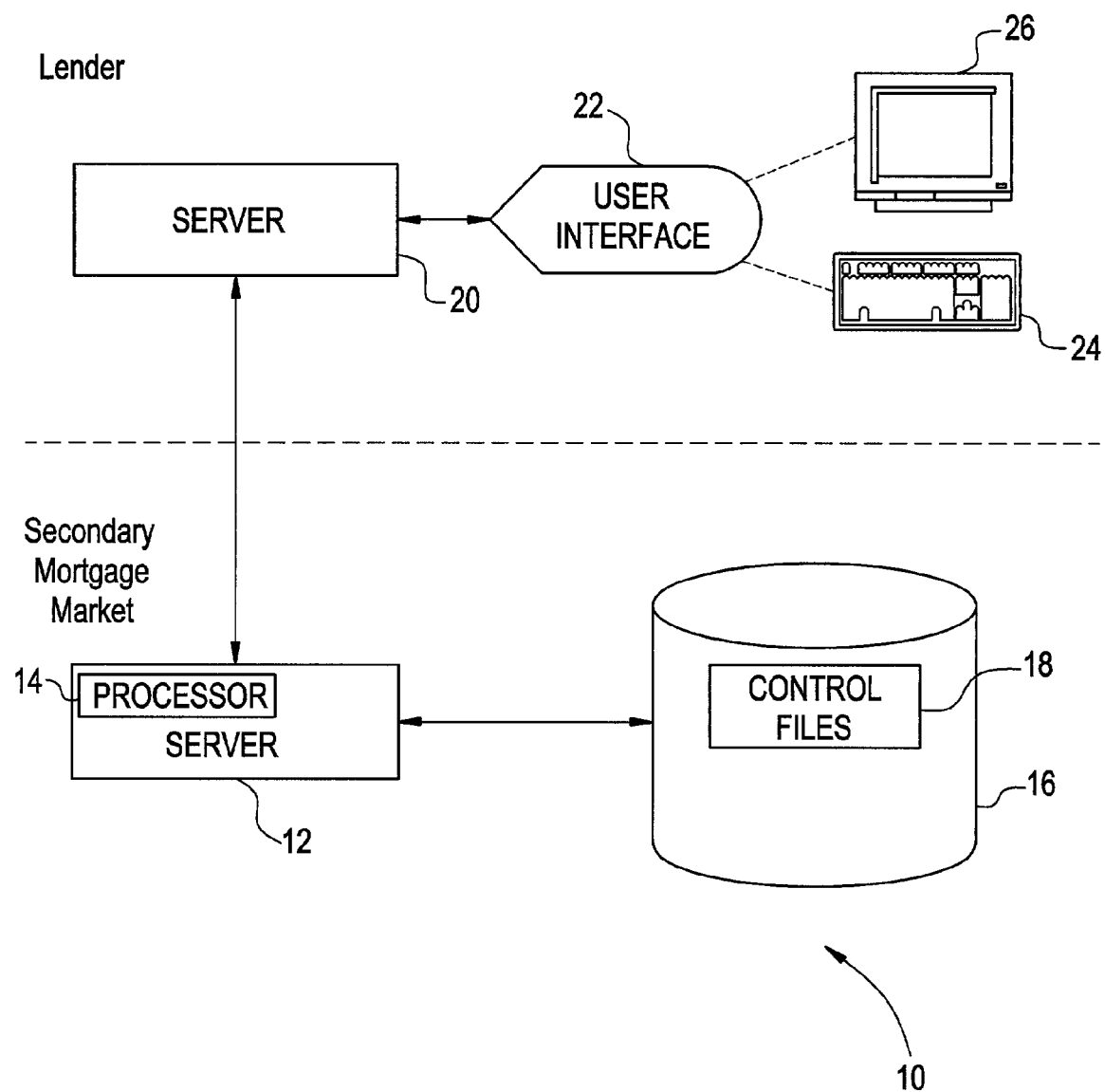
FIG. 1 is a schematic diagram of a system constructed and arranged in accordance with a preferred embodiment of the present invention.

FIG. 1 depicts a simplified schematic illustration of a system, generally indicated as reference number 10, which includes the component elements and means necessary to effect and control the various process steps according to the present invention as described hereinafter. Desirably, and where appropriate, system 10 utilizes existing computer capabilities, both hardware and software, and electronic communications links, for example, to display loan information to a potential borrower and to receive and process, in real time, information input by the potential borrower.

System 10 preferably includes a computer server 12 which includes a processor 14. Server 12 preferably has electronic access to a database 16 containing control files 18 also known as look-up tables. Server 12 operates under the control of computer software to carry out the inventive process steps described in greater detail hereinafter. The computer software can include sets of software objects and/or program elements collectively having the ability to execute independently in a separate thread or logical chain of process execution, while permitting the flow of data inputs therebetween. Each can be executed as a separate logical server or using a separate physical device. However, for lenders and potential borrowers, server 12 preferably operates as a single logical server.

Server 12 is preferably electronically coupled to a remote server 20 on the lender side. Remote server 20 is preferably coupled to a user interface 22 including conventional input and display devices 24 and 26. User interface 22 is preferably a remote interface coupled to remote server 20 via a publicly accessible global computer network. A common example of such a network is the Internet.

Users of the inventive system include potential borrowers (e.g., home buyers), loan originators, which can be mortgage companies, savings and loans or other lending institutions. Desirably, the loan originators also include prospects in the mortgage lending business.

Although functionally distinct, it should be understood that the various functions of the inventive system preferably overlap when it comes to the flow of data inputs therethrough in order to avoid requiring entry of the same core data more than once. For example, information input by the potential borrower and used by system 10 to design a customized mortgage loan as described in greater detail hereinafter can be used to populate a loan application and can be used in pricing and underwriting the loan.

Figure 2:
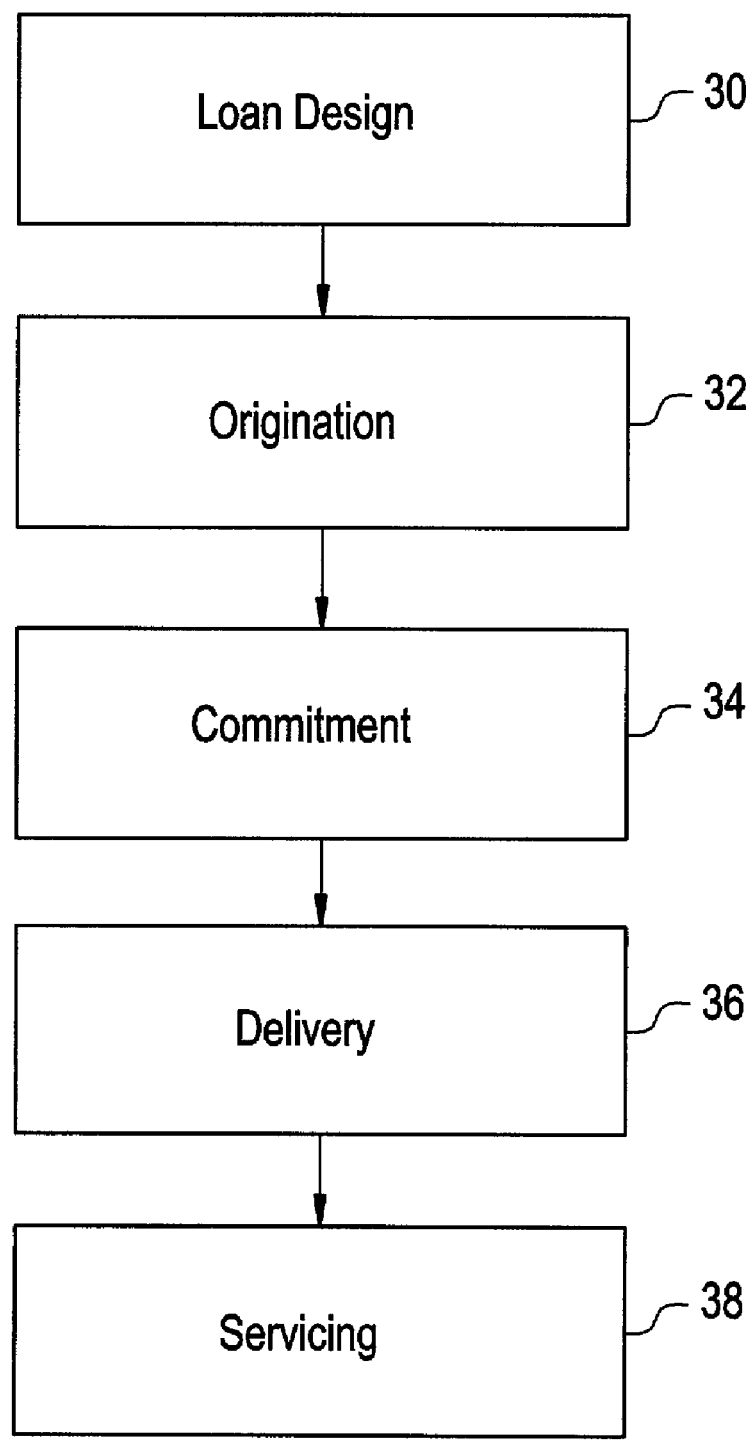
FIG. 2 is a high-level flow chart depicting the process flow of a customized mortgage loan according to the present invention in the primary and secondary mortgage markets.

Referring now to FIG. 2, the process flow for a customized loan according to the present invention preferably involves designing the customized loan (step 30), originating the loan (step 32), committing (selling) the loan in the secondary mortgage market (step 34), delivering the loan to the secondary mortgage market purchaser (step 36) and servicing the loan (step 38).

Although not indicated in the drawings, it should be understood that the process flow for a customized loan according to the present invention can also involve guaranteeing the loan. The decision by a guarantor to guarantee a customized loan desirably would be based on a review of the customized loan to determine if it meets the requirements of the guarantor.

Figure 3A:
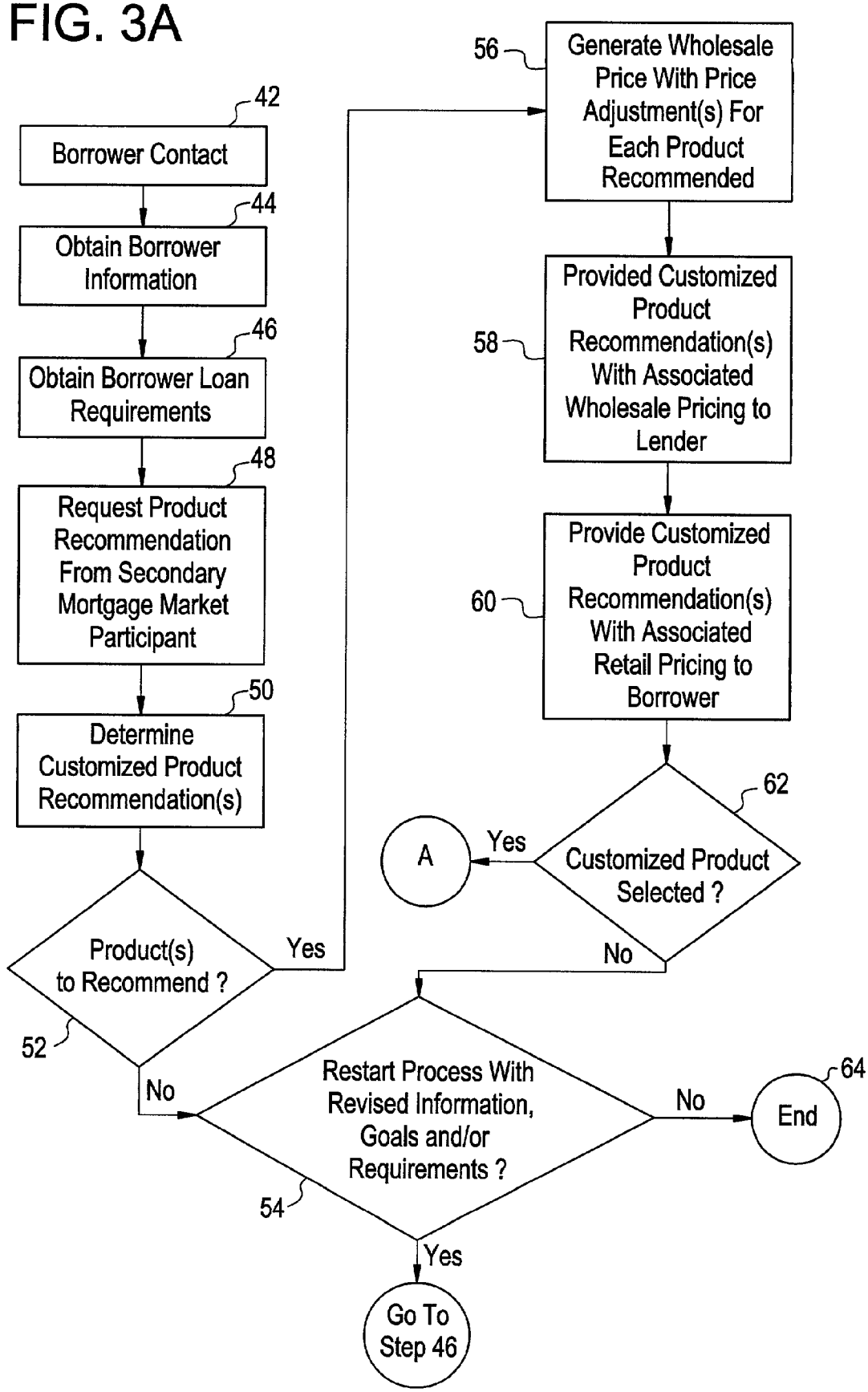
FIG. 3a is a flow chart depicting a preferred embodiment of the mortgage loan customization process according to the present invention.

Referring now to FIG. 3a, the loan customization process according to the present invention begins when a potential borrower contacts a lender, e.g., online or directly (step 42). Desirably, the potential borrower then provides borrower information and property information for input into system 10 (step 44).

FIG. 5 shows an example user interface display used to capture borrower information and property information in accordance with the method of the present invention.

Referring back to FIG. 3a, at step 46 system 10 interviews the potential borrower about the borrower's individual mortgage needs and financial goals. Preferably, this is facilitated by soliciting borrower responses to a pre-fill form/questionnaire. This process can occur at an online location such as the borrower's home or at the lender's office, and the lender can assist the borrower in this process.

The pre-fill form/questionnaire can be provided in hard copy or electronically. It can be supplied, for example, via stand-alone computer software (e.g., contained on media such as a CD-ROM or floppy disk and then stored on a hard disk), or over a telecommunications medium (e.g., over a global computer network such as the Internet). The pre-fill form/questionnaire can therefore be accessed on a stand-alone computer or a computer connected to a network which can be the Internet or a local or wide area dedicated or private network.

The inquiries made of the borrower by system 10 during the interview (step 46) can include questions along the following lines, for example: (i) what is the property type and value of the subject property, (ii) what is the mortgage loan amount, (iii) how long does the borrower plan to stay in the subject property, (iv) how often is the borrower paid, (v) does the borrower want to match loan payments to paydays, (vi) does the borrower have more income in certain months than others, (vii) what payment stability does the borrower require, (viii) when does the borrower want to pay off the mortgage, (ix) does the borrower prefer to maximize tax deductions or to build equity, (x) does the borrower want to miss certain loan periods each year, (xi) does the borrower want a portable loan, and (xii) does the borrower want an assumable loan?

Also, the borrower is given the opportunity to affirmatively request specific mortgage product features (including, for example, an associated home equity line of credit—"HELOC"). That is, the borrower may pick and choose loan features to build the loan from the ground up. Desirably, this can be accomplished by selecting such features from the pre-fill form portion of the pre-fill form/questionnaire (such as shown in FIG. 7).

Preferably, certain questions can ultimately be used in determining whether the loan sought by the borrower meets eligibility guidelines of the secondary mortgage market purchaser. The pre-fill form/questionnaire preferably identifies loan factors and other factors that are most important in obtaining a mortgage loan approval recommendation within existing underwriting schemes.

Figure 6:
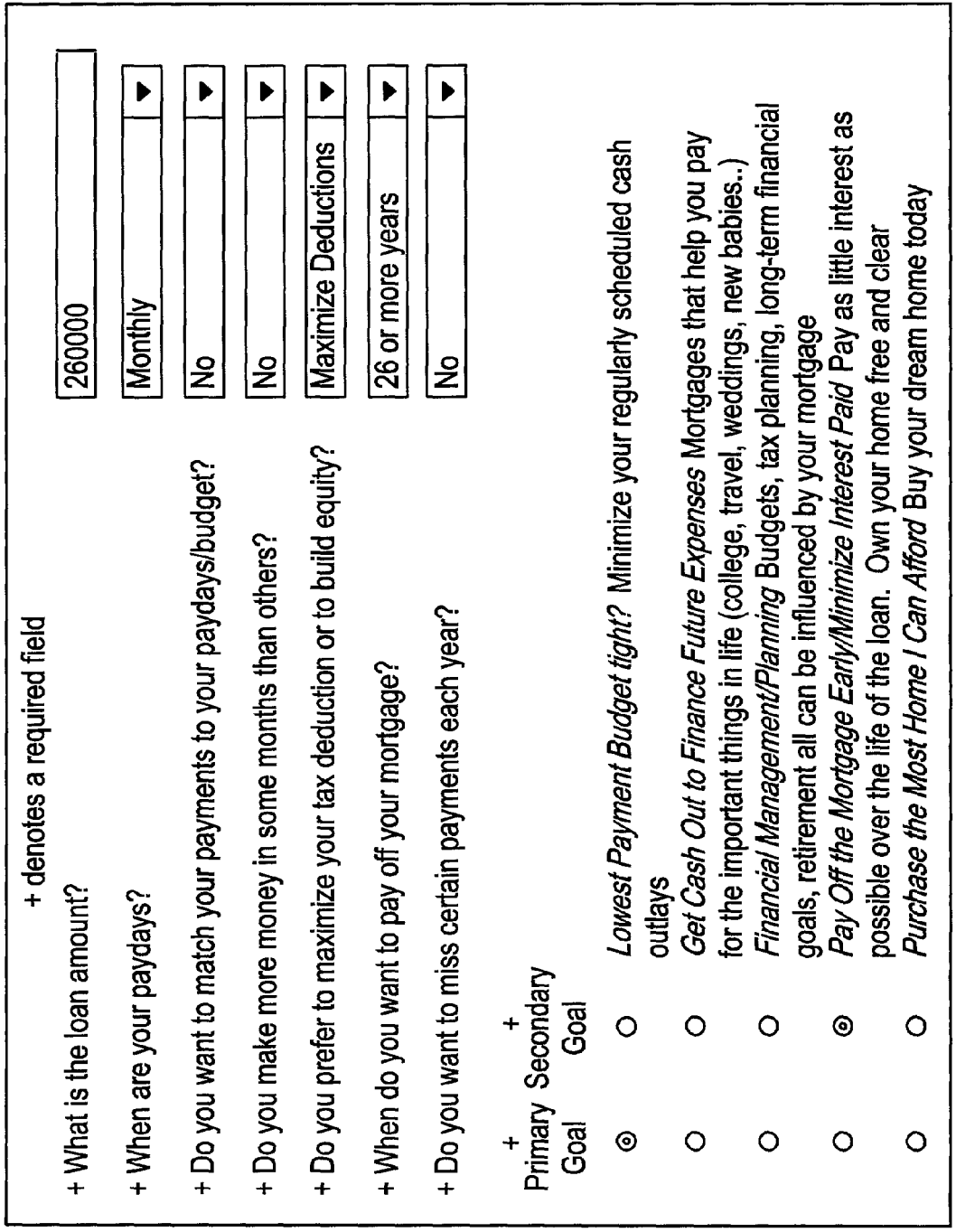

FIG. 6 shows an example user interface display used to present questions to the borrower and to capture the borrower's responses and information concerning the borrower's financial goals in accordance with the method of the present invention. FIG. 7 shows an example user interface display for capturing borrower selections for specific mortgage product features. In this example, the borrower has the opportunity to select a myriad of loan feature combinations.

Mortgage loan features open to customization according to the inventive method and system preferably include, but are not necessarily limited to, interest rate, mortgage loan term, amortization term, loan payments, portability and assumability.

The customizable interest rate feature preferably includes the option of converting from a fixed rate to an adjustable rate, or vice-versa, during the life of the loan. This enables borrowers to react to changes in mortgage interest rates while avoiding the loan refinancing process.

With the option of customizing the mortgage loan term (i.e., the time to maturity of the loan), the borrower can select a mortgage term preferably from 60 months to 480 months. Additionally, the borrower can choose to change the term and recast the payments accordingly during the life of the loan. Choosing a longer mortgage term can allow a borrower to pay less earlier (e.g., so that the borrower can afford a home sooner and build equity). Increasing payment frequency later on can result in savings on interest expenses and pay off of principal with greater speed.

Similarly, with the option of customizing the amortization term (i.e., the amount of time, in months, required to repay the loan), the borrower can select a term preferably from 60 months to 480 months.

It should be understood that the mortgage term and amortization term are the same except when interest only payments is a selected loan payments feature. For interest only loans, the mortgage term equals the interest only period added to the amortization term.

With the interest only payments feature, the borrower can choose to make payments of interest only (no principal) for a specified period of time. Choosing the interest only feature can allow the borrower to pay less earlier (e.g., so that the borrower can afford a home sooner) and enable the borrower to invest the principal portion to build savings. It can also permit the borrower to maximize interest deductions over the interest only period.

The loan payments feature preferably also includes the option of selecting curtailment recast, payment frequency and payment dates, fewer than 12 months of payments, skipping payments and graduated payments.

Curtailments are payments in excess of the scheduled amount. Excess payments can be applied to the unpaid balance of the loan, thereby shortening the term. With the curtailment recast feature, when the pay down of the principal balance is greater than a preselected threshold amount, the borrower has the option to have the loan payments recast (and lowered) over the remaining term of the loan. So, for example, if a borrower gets a big bonus check or lands a high-paying job, with the curtailment recast feature the borrower can apply the increased income to the mortgage to reduce monthly payments and the overall interest expense.

With the option of customizing payment frequency, the borrower can match payments with budget or income frequency. The borrower can choose to make mortgage payments on a weekly, bi-weekly, semi-monthly, monthly or quarterly schedule. This feature can be offered in combination with any other feature with the possible exception of the payment date on non-monthly payment frequencies.

The borrower can also select the loan payment date from any day from the 1st through the end of each month (on monthly payment frequency loans).

The borrower can also opt to have fewer than 12 months of payments per year. Preferably, payments are made on the equivalent of 10 months or 11 months. The months that payments will not be made preferably are selected at the time the option is exercised. The reduced number of payments will amortize the loan on an annual basis. For example, a loan fully amortizes over a specified period (e.g., 30 years) with a reduced number of monthly payments (i.e., 300 rather than 360). Also, it should be understood that payment frequencies other than monthly are contemplated. The mortgagor can choose to make 44 to 48 weekly payments, 22 to 24 bi-weekly or semi-monthly payments or 10 to 11 monthly payments. If the payment frequency is not monthly, the payments not made should preferably fall into monthly groups (4 weekly, 2 bi-weekly, or 2 semi-monthly payments).

The fewer than 12 months of payments feature has the benefit of allowing the borrower to manage fluctuations in income or expenses. The skipping payment feature also provides this benefit to the borrower.

The borrower can opt for a mortgage that permits the borrower to skip one or more mortgage payments in a 12-month cycle. The skipped payment reflects the full monthly payment (principal, interest, taxes and insurance). The skipped payment can be reamortized into the unpaid balance of the loan at the original note rate over the remaining term of the loan. Alternatively, the borrower can simply repay the skipped payment plus accrued interest in a subsequent period. A loan level price adjustment or a per skip transaction charge or a combination thereof can be assessed for the skip payment feature.

The borrower can also select a graduated payment feature. Such feature, characteristic of graduated payment mortgages (GPMs), permits the borrower to begin with lower payments that rise annually over the first 5 to 10 years, for example, and then remain constant for the remainder of the loan. The lower initial payments enable borrowers to qualify for a mortgage loan with less income than is needed for a comparable level payment loan. With a 30 year term, early payments are lower than the interest owed to the lender, so negative amortization occurs. The payments level off at an amount higher than a borrower would pay at the same point in a level payment loan, because negative amortization is paid off in addition to the original amount of the loan.

The borrower can also select a growing equity feature. Such a feature, characteristic of growing equity mortgages (GEMs) permits rapid payoff of the mortgage loan. With this feature the borrower starts paying the same amount as for a level-payment, fixed-rate mortgage at the same rate. Increases in payments are used entirely to reduce the balance owed. Because of the increased payments, the borrower can pay off a 30 year loan in 15 to 20 years, possibly less, for example. This feature has the benefit of allowing the borrower to build equity to, for example, save for a future life event (e.g., college expenses, home improvements).

In addition to the ability to customize interest rate, loan term, amortization term, and loan payments, the borrower can desirably choose features of portability and assumability. A portable mortgage permits the borrower to transfer the mortgage to a new property. An assumable mortgage permits a new purchaser of the mortgage property to assume the original mortgagor's mortgage, if the new borrower qualifies for the loan.

It should be understood that other loan features can be available for customization according to the system and process of the present invention. These can include, without limitation, features related to preserving loan collateral, as well as protecting against credit impairment and the impact of unanticipated life events.

For example, a mortgage loan can be customized to include a managed home maintenance plan feature. Such a feature provides the borrower with coverage for the cost of qualifying home repairs over the term of the mortgage. This feature protects the borrower against the financial uncertainty and risk associated with costly and often unexpected home repairs. Moreover, it provides the borrower with the incentive and the means to maintain the value of the loan collateral.

Also, the loan can be customized to include a feature that covers the borrower for a missed loan payment. With this feature, a payment missed by the borrower is made by a source other than the borrower. This allows the borrower to avoid defaulting on the loan and the concomitant adverse impact on the borrower's credit history. Such a feature can apply in situations where (i) the costs associated with an unanticipated life event (e.g., death, disability, divorce, unemployment) prevent the borrower from making the loan payment, or (ii) the borrower inadvertently misses making the payment even though the borrower has the resources to make the payment.

It should be understood that a loan level price adjustment or a per transaction charge or a combination thereof can be assessed for features open to customization according to the present invention. It should also be understood that features open to customization may be selected or adopted prior to loan origination, after the loan has closed, or even after a default.

Furthermore, it should be appreciated that loan features open to customization according to the system and process of the present invention can be selected as an option that, at the borrower's discretion, may or may not be exercised during the loan term. For example, a loan may be customized to give the borrower the option of switching from payments of principal and interest to interest only payments during the loan term.

Referring back to FIG. 3a, based on the responses and mortgage product feature specifications provided by the borrower, system 10 requests a product recommendation from the secondary mortgage market participant (step 48). In step 50, the secondary mortgage market participant determines one or more product recommendations in response that are customized to meet the goals and requirements communicated by the borrower.

In one embodiment of the present invention, database 20 of system 10 can store a matrix of all possible combinations of question responses, borrower requests, goal sets and product features and associated product recommendations to generate the customized mortgage product recommendation(s) based on the goals and requirements communicated by the borrower.

It should be understood that the mortgage product recommendation(s) determined by system 10 represent loans and combinations of loan features fashioned specifically for the borrower taking into account the individual borrower's communicated goals and requirements. They are not pre-packaged mortgage products offered by the lender (unless a product recommendation happens to be the equivalent of a pre-packaged product which meets the individual needs of the borrower). Desirably, the customized product recommendation(s) will enable the lender to create product/market uniqueness to retain competitive advantage.

At decision 52, if a customized mortgage product recommendation cannot be determined based on the information provided by the borrower, the borrower is preferably given the opportunity at decision 54 to restart the process (by revisiting step 46) with revised information, goals and/or requirements or end the process (event 64).

If a customized mortgage product recommendation(s) is determined (decision 52), the secondary mortgage market participant preferably calculates a wholesale rate associated with each mortgage product recommendation consisting of a current ("live") base portfolio yield plus mortgage product feature-based adjustments to such yield and any applicable fees (step 56). The wholesale rate is the rate required by the secondary mortgage market participant to take the loan commitment. The wholesale rate is preferably integrated with the lender's retail market strategy.

Figure 3B:
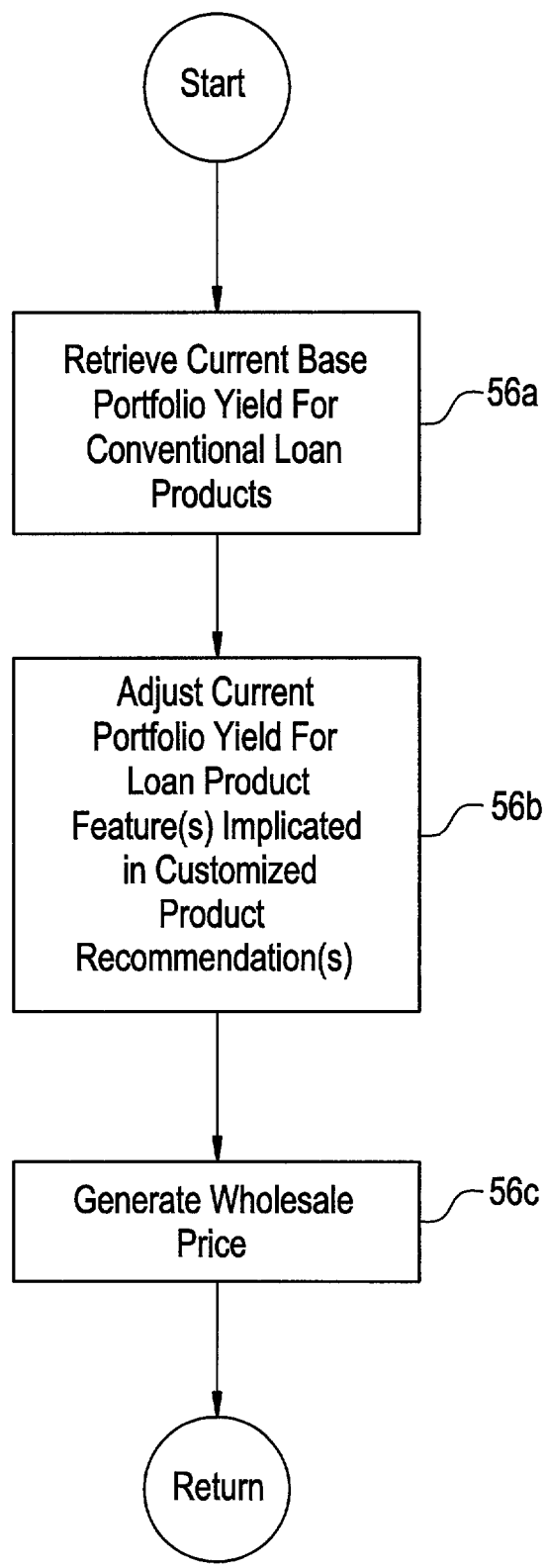
FIG. 3b is a flow chart depicting a preferred process of generating a wholesale price for a recommended customized product in the mortgage loan customization process according to the present invention.

Referring to FIG. 3b, the pricing for mortgage product features available for customization according to the method and system of the present invention is preferably initially based on conventional fixed rate products. In determining wholesale price, the secondary mortgage market participant can determine required net yield (RNY) based on current "live" pricing for standard fixed rate mortgage products by term (e.g., a 30 year fixed rate mortgage) and for interest only loans (step 56a). Because these standard fixed rate products or base products are rated "live," their rates change as the market dictates. Because interest rates can fluctuate rapidly, it is desirable to re-post rates based upon current market conditions.

An appropriate adjustment in basis points is then added to the RNY for any selected mortgage product feature(s) and associated fees (step 56b). Each mortgage product feature is preferably priced at an appropriate preselected (RNY) adjustment.

Desirably, adjustment factors are calculated for more than one feature without making the par yield go too high. Since many of the customized features change the effective maturity of the loan, a rules-based pricing approach involving the computation of an effective maturity is preferred. The rules-based pricing methodology preferably involves a table containing rate (or yield) adjustments for each feature and maturity. The rules then specify how different elements of the table are added together to arrive at the rate adjustment for a combination of loan features. An example of such a table is shown below. Each element is the rate adjustment made compared to a "standard" fixed rate loan with the same maturity and monthly payment frequency rated at par. For simplicity, the amortization term is assumed to be equal to the mortgage term, and the curtailment recast option is left out.

TABLE 1

Example Rate Adjustment Table

| Loan Feature | Loan Term (in years) | | | | | |
|---|---|---|---|---|---|---|
| | Low | 10 | 15 | 20 | 30 | High |
| Bi-weekly Pay | 0 | 0 | 0 | 0 | −01 bp | −02 bp |
| Weekly Pay | 0 | 0 | 0 | 0 | 0 | 0 |
| 10/20 yr. Interest Only | 0 | 0 | 0 | 0 | 22 bp | 0 |

TABLE 1-continued

Example Rate Adjustment Table

| Loan Feature | Loan Term (in years) | | | | | |
| --- | --- | --- | --- | --- | --- | --- |
| | Low | 10 | 15 | 20 | 30 | High |
| 15/15 yr. Interest Only | 0 | 0 | 0 | 0 | 25 bp | 0 |
| Fewer Than 12 Payments | 0 | 0 | 0 | 0 | 0 | 0 |

The two columns "Low" and "High" reflect the fact that the effective maturity of a combination of loan features can be higher or lower than the stated maturity. During the application of the pricing rules a "maturity index" preferably indicates the column to use. Within the "High" and "Low" boundaries, one can move right or left in the table by adding to or subtracting from the maturity index.

"Live" RNYs and feature-level rate adjustments are preferably stored in and can be accessed from look-up table 18 in database 16. It will be appreciated that access to current secondary mortgage market participant rates is preferably required at three different points in the process flow of a customized mortgage in the primary and secondary mortgage markets: (i) when the borrower is designing a loan, (ii) when the lender commits to sell the loan to the secondary mortgage market purchaser, and (iii) when the secondary mortgage market purchaser actually acquires the loan.

The product recommendation(s) and associated wholesale pricing information (generated in step 56*c*) are provided to the lender (FIG. 3*a*, step 58). Referring to FIG. 3*a*, the lender then provides the product recommendation(s) and associated retail pricing to the borrower for consideration (step 60). The retail price is the "rate" the borrower will pay the lender for the loan. The retail price is typically the wholesale rate plus some add-on for the lender. This "rate" can be either in the form of a fee (e.g., points) or rolled into the interest rate for the mortgage loan.

FIG. 8 shows an example of a user interface display used to present customized mortgage product recommendations to the potential borrowers according to the present invention.

Referring back to FIGS. 3*a* and 3*b*, each of the steps 42–64 is preferably executed by software resident on server 12.

Referring to FIG. 3*a*, if the borrower wishes to proceed with a customized mortgage product recommended via the lender (decision 62), the lender preferably implements its loan origination process to handle the application, underwriting and closing of the loan (FIG. 4 at A); otherwise, the borrower is preferably given the opportunity to restart the process at step 46 with revised information, goals and/or requirements (decision 54), or end the process (event 64).

Figure 4:
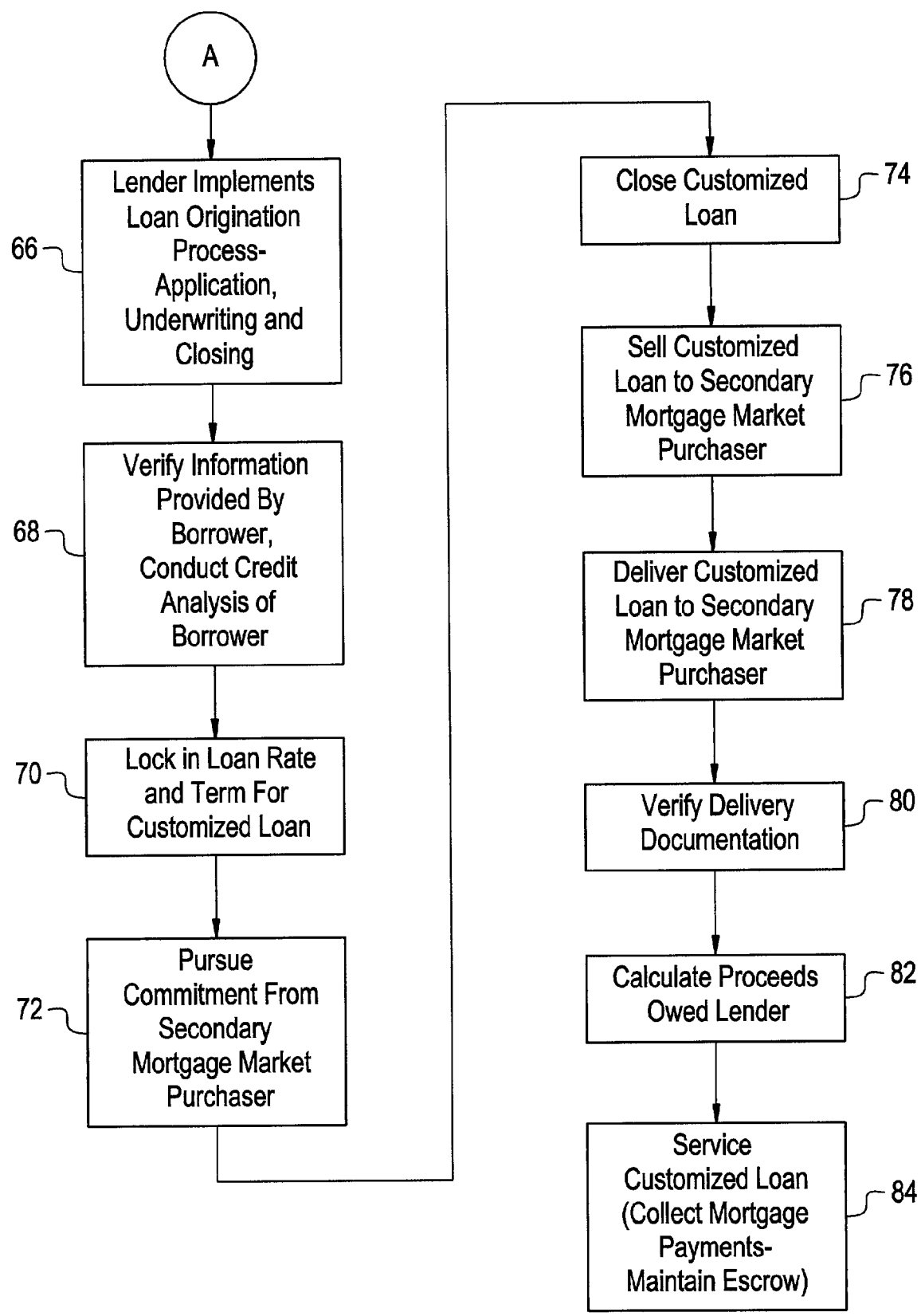
FIG. 4 is a flow chart depicting processes that occur downstream of the mortgage loan customization process according to the present invention depicted in FIG. 3; and, FIGS. 5–9 depict exemplary user interface displays illustrating aspects of the mortgage loan customization process according to the present invention.

Desirably, the lender can assign an identifier or code to each selected customized product to identify such products in downstream processes (including the processes depicted in FIG. 4).

FIG. 9 shows an example user interface display used to inform potential borrowers about the mortgage product customization process according to the present invention.

Referring now to FIG. 4, the processes that preferably occur downstream of the process for designing a customized loan according to the method and system of the present invention are shown. These downstream processes include loan origination, commitment, delivery and servicing.

The loan origination process begins at step 66 when a borrower decides to apply for a recommended customized mortgage product according to the present invention.

Desirably, information provided by the borrower is verified (step 68)—e.g., the address of the real property that is intended to underlie the loan being applied for ("address scrubbing") and the credit worthiness of the borrower (e.g., through a credit report on the borrower).

When a borrower selects a customized mortgage product and applies for the customized loan, the lender will preferably lock in the loan rate and term (step 70). The lender can then pursue a negotiated commitment to purchase the loan from the secondary mortgage market participant at either a loan level or aggregate level (step 72). It should be appreciated that this process can be an electronic commitment, streamlining the process and lowering costs to the borrower, lender and secondary mortgage market participant. The secondary mortgage market participant can commit to customized loans that meet preselected eligibility requirements of the secondary mortgage market purchaser (which requirements can be stored in database 16) and that comply with the customized product recommendation of the secondary mortgage market purchaser.

After the loan is closed (at step 74), the lender can sell the loan to the secondary mortgage market purchaser in the secondary market pursuant to the negotiated commitment (step 76). Purchased loans are then delivered (preferably, electronically) to the secondary mortgage market purchaser (step 78). Desirably, all delivery documentation is verified (step 80).

When the loan is delivered to the secondary mortgage market participant, the proceeds that are owed the lender are calculated (step 82). This calculation is based on the customized RNY on the commitment plus any feature adjustments that apply to the loan as it is delivered. Look-up table 18 of database 16 can be accessed for current feature-level pricing.

After a customized loan is delivered to the secondary mortgage market purchaser, the loan is serviced (step 84). That is, mortgage payments are collected from the borrower and applicable escrow accounts are maintained, preferably by an entity hired to service the loan ("servicer").

The servicer will preferably report all loan-level activity on customized loans (including any changes in status of a customized loan, e.g., mortgage rate or other modifications) to the secondary mortgage market participant.

Preferably, mortgage loan customization according to the present invention is rules-based. That is, the secondary mortgage market participant preferably sets rules for the selection and combination of the mortgage loan product features open to customization according to the method and system of the present invention. Such rules can be stored in database 16.

For example, for customizable mortgage loan features concerning payment frequency, the secondary mortgage market participant can require that (i) all loans will be monthly accrual loans, (ii) monthly payments (12 payments per year), bi-weekly payments (26 or 27 payments), weekly payments (52 or 53 payments) and quarterly (4 payments per year) will be supported, (iii) the borrower will have the option of selecting the payment frequency at the start of the loan, but the payment frequency cannot change during the life of the loan, (iv) loans will be considered delinquent when a scheduled payment is not made by the due date, (v) payments should be electronically drafted from the borrower's account for weekly and bi-weekly payments.

Additional rules may concern the amortization/payment calculation of principal and interest for various payment frequencies. For example, the secondary mortgage market participant may require that (i) bi-weekly payments of principal and interest are calculated as 50% of the monthly payment, (ii) weekly payments are calculated as 25% of the monthly payment, (iii) all extra payments are treated as principal curtailments.

Regarding the mortgage term and amortization term (which is the same except when interest only payments is a feature of the loan), the secondary mortgage market participant can, for example, require that these borrower-selected terms range from 60 months to 480 months, and that once the amortization term is chosen, it will not change throughout the life of the loan.

For the curtailment recast mortgage product feature, the secondary mortgage market participant can, for example, provide that there is no threshold that must be met in order for the loan to be re-amortized and that a servicing fee will be charged for each recast.

For the interest only payment feature, the following rules can, for example, be set by the secondary mortgage market participant: (i) an interest only period can be scheduled only at origination for either 10 or 15 years starting with the first payment, (ii) only one interest only period will be allowed during the life of the loan, (iii) any curtailments during the interest only period are applied to the unpaid principal balance and result in a recast payment with no fee being charged during the interest only period for recasts. Alternatively, rules can provide, for example, that the interest only payment feature can take effect within the loan term.

For the feature of fewer than 12 months of payments, the secondary mortgage market participant can, for example, provide that (i) the borrower has the option of selecting the feature at the start of the loan, (ii) the borrower will be able to select 1 or 2 months to be non-payment months, (iii) once decided, the non-payment month(s) will not change during the life of the loan, (iv) the first and second payment months cannot be scheduled non-payment months in the first year, but in subsequent years they can be.

Rules can also be set to govern the ability to combine product features in a mortgage loan customized according to the method and system of the present invention. For example, secondary mortgage market participant rules can provide that a mortgage product having a selected term, a weekly payment frequency, an interest only payment feature, and a curtailment recast feature, cannot be combined with the fewer than 12 months of payments feature as that feature is susceptible of being combined with only a mortgage product having a monthly payment frequency.

Some representative practical examples highlighting the benefits of the method and system for customizing mortgage loans according to the present invention are discussed below.

First time homebuyers are concerned about financing the education of their child 15 years hence, but also need to keep their mortgage payments as low as possible today as they start to advance in their careers. The borrowers access system 10 of the present invention via the Internet website of the secondary mortgage market participant's lender partner. From a system pre-fill form/questionnaire designed to solicit information concerning the goals of the borrowers, the borrowers select "lowest payments" as their primary goal and "finance future life events" (i.e., their child's college education) as another goal. When prompted by the system, the borrowers also indicate that the expected life event is in 6+ years and is expected to be a significant amount. The system returns the following customized mortgage recommendations: (i) a GPM starting at the interest only rate for the first 2 years, and payments increasing 6% annually for 7 years, (ii) a monthly GPM with a starting payment rate of 1% less than the note rate with annul payment increases of 4%, (iii) a bi-weekly loan based on 50% of a conventional 30 year payment, and (iv) a 25 year fixed rate mortgage. The borrowers are also given the opportunity to add the following features to their mortgage: (i) selected payment date, (ii) fixed rate convertible option, (iii) portable option, (iv) assumable option, and (v) home equity line of credit.

An investment banker enters the mortgage business in conjunction with third-party service providers by offering a financial planning mortgage that allows borrowers to pay $100.00 extra per mortgage payment (bi-weekly) for investment in a mutual fund account. Once the balance in the mutual fund account (adjusted for expected capital gains taxes) is equal to or greater than the loan, the borrower is given the option to sell the mutual fund and pay off the loan. This allows the borrower to pay the loan off more rapidly, especially in a continued bull market.

A borrower wants to pay off his loan aggressively. The borrower receives compensation in the form of commission checks paid on the first Monday following the third Wednesday of the month. The borrower meets with a lender and, utilizing system 10 of the present invention, selects a 1 year ARM, 2% margin, no annual cap, 7% lifetime cap, starting at 5.25%, but initial payments based on a 7% payment rate on a 10 year term. Loan payments are due on the 23rd of the month with a 15 day grace period. This combination is designed to reduce total interest paid. Furthermore, the quick amortization in the first year almost guarantees that the lack of annual interest rate caps will not negatively impact the borrower's payments.

A borrower wants a loan that will change as the borrower's life changes. The borrower enters information into system 10 of the present invention via the Internet website of the secondary mortgage market participant's lender partner. The borrower selects a portable loan that will change throughout the borrower's life; $125,000 30 yr. fixed with 80% loan to asset value (LTV) and a pledged asset (the borrower's 401K) of $46,875 (30%) reducing the secondary mortgage market participant's risk to a 50% LTV. The loan is set up as a GEM with payments increasing 2% each year (7.125%, 30 yr. payment term). Twelve years later when the borrower's child is entering college, the loan will switch to a 5 year reverse mortgage paying out $1,200 per month to help with tuition, room and board. Finally the loan will switch to a 1 year ARM with a 20 year term so that the borrower can pay off the borrower's home by the time the borrower turns age 65.

In accordance with the foregoing, the present invention provides an online system and process that permits a lender to offer a borrowers a mortgage loan product built from the ground up based on the borrower's individual needs, specifications and goals. It should be appreciated that the inventive system and process allows lenders to offer customized loan products on a mass produced basis.

In so far as embodiments of the invention described herein can be implemented, at least in part, using software controlled programmable processing devices, such as a computer system, it will be appreciated that one or more computer programs for configuring such programmable devices or system of devices to implement the foregoing described methods are to be considered an aspect of the present invention. The computer programs can be embodied as source code and undergo compilation for implementation on processing devices or a system of devices, or can be embodied as object code, for example. Those of ordinary skill will readily understand that the term computer in its most general sense encompasses programmable devices such as those referred to above, and data processing apparatus, computer systems and the like.

Preferably, the computer programs are stored on carrier media in machine or device readable form, for example in solid-state memory or magnetic memory such as disk or tape, and processing devices utilize the programs or parts thereof to configure themselves for operation. The computer programs can be supplied from remote sources embodied in communications media, such as electronic signals, radio frequency carrier waves, optical carrier waves and the like. Such carrier media are also contemplated as aspects of the present invention.

It will thus be seen that the objects set forth above, among those made apparent from the preceding description, are efficiently attained and, since certain changes can be made in carrying out the above method and in the constructions set forth for the system without departing from the spirit and scope of the invention, it is intended that all matter contained in the above description and shown in the accompanying drawings shall be interpreted as illustrative and not in a limiting sense.

It is also to be understood that the following claims are intended to cover all of the generic and specific features of the invention herein described, and all statements of the scope of the invention which, as a matter of language, might be said to fall therebetween.

What is claimed is:

1. A computer-implemented method for providing a borrower with a mortgage loan that is customized to meet the requirements of the borrower, comprising the steps of:

obtaining loan requirements from the borrower by soliciting responses from a user using a computer-implemented user interface comprising at least one input device and at least one output device, determining at least one mortgage loan product having a plurality of loan features, the plurality of loan features including interest rate and loan term, and the plurality of loan features further including a customized combination of loan features, the customized combination of loan features being selected to meet the loan requirements from the borrower, wherein the customized combination of loan features includes a plurality of the loan features selectable from the following: fewer than 12 months of payments, graduated payments, portability, payment coverage for missing a loan payment without adverse credit history consequences, a borrower-selected payment date selectable by the borrower from any day through the end of each month, and a borrower-selected payment frequency selectable by the borrower from a plurality of possible payment frequencies, including bi-weekly and monthly, applying the loan requirements from the borrower to a set of stored rules for combining loan features, the set of stored rules being configured to assess compatibility of the customized combination of loan features with each other, calculating at least one of a price and an interest rate for at least one customized mortgage loan product for presentation to the borrower together with the at least one customized loan product, wherein calculating of the at least one of a price and an interest rate is executed by a data processor, and wherein the computer-implemented user interface solicits the response by providing a pre-fill form/questionnaire comprising a series of questions configured to solicit information concerning how the borrower ranks the importance of various available loan features that may subsequently be selected and included as part of the customized combination of loan features in the customized mortgage loan product.

2. The method of claim 1, wherein the step of calculating at least one of a price and an interest rate for the at least one customized loan product involves the steps of calculating a first price at which a secondary market purchaser would purchase the at least one customized loan product and calculating a second price based on the first price for presentation to the borrower.

3. The method of claim 2, wherein the step of calculating the first price involves retrieving a required yield from a source of current pricing for conventional loans and calculating adjustments to the required yield associated with the features of the at least one customized loan product.

4. The method of claim 3, wherein the step of calculating adjustments to the required yield includes applying the features of the at least one customized loan product to a set of rules for determining the price adjustments.

5. The method of claim 2, wherein the step of calculating the second price involves adjusting the first price to reflect a lender add-on.

6. The method of claim 1, wherein the features of the at least one customized loan product include loan collateral maintenance.

7. The method of claim 6, wherein the loan collateral maintenance feature is a managed home maintenance plan, the managed home maintenance plan providing the borrower with coverage to pay at least a portion of the cost of qualifying home repairs during at least a portion of the term of the mortgage.

8. The method of claim 1, wherein the features of the at least one customized loan product include payment coverage for a missed loan payment, the payment coverage being configured such that loan payment may be missed by the borrower without adverse impact on the borrower's credit history.

9. The method of claim 1, wherein a pre-fill form/questionnaire is provided over a global computer network.

10. The method of claim 9, wherein the global computer network is the Internet.

11. The method of claim 1, wherein the loan requirements of the borrower include at least one of specific loan product features desired by the borrower and financial goals of the borrower.

12. The method of claim 1, further comprising the steps of revising the loan requirements of the borrower and determining at least one new customized loan product having features based on the revised loan requirements if the at least one customized loan product based on the borrower's previous loan requirements is not selected by the borrower.

13. The method of claim 1, further comprising the step of processing an application for a customized loan selected by the borrower.

14. The method of claim 13, further comprising the step of obtaining a commitment from the secondary market purchaser to purchase the customized loan.

15. The method of claim 14, further comprising the steps of closing the customized loan and selling the customized loan to the secondary market purchaser.

16. The method of claim 15, further comprising the steps of servicing the customized loan.

17. A computer-implemented system for providing a borrower with a loan that is customized to meet the requirements of the borrower, comprising:

input means for obtaining loan requirements from the borrower by soliciting responses from a user trough a user interface comprising at least one input device and at least one output device, means for determining at least one loan product having a plurality of loan features, the plurality of loan features including interest rate and loan term, and the plurality of loan features further including a customized combination of loan features, the customized combination of loan features being selected to meet the loan requirements of the borrower, wherein the customized combination of loan features includes a plurality of the loan features selectable from the following: fewer than 12 months of payments, graduated payments, portability, payment coverage for missing a loan payment without adverse credit history consequences, a borrower-selected payment date selectable by the borrower from any day through the end of each month, and a borrower-selected payment frequency selectable by the borrower from a plurality of possible payment frequencies including bi-weekly and monthly, means for applying the loan requirements from the borrower to a set of stored rules for combining loan features, the set of stored rules being configured to assess compatibility of the customized combination of loan features with each other, means for calculating at least one of a price and an interest rate for the at least one customized mortgage loan product for presentation to the borrower together with the at least one customized loan product, wherein calculating of the at least one of a price and an interest rate is executed by a data processor, the data processor being coupled to the user interface through a global computer network, and wherein the input means solicits the response by providing a pre-fill form/questionnaire comprising a series of questions configured to solicit information concerning how the borrower ranks the importance of various available loan features that may subsequently be selected and included as part of the customized combination of loan features in the customized mortgage loan product, the input means providing the pre-fill form/questionnaire by way of the global computer network.

18. The system of claim 17, wherein the means for calculating a price for the at least one customized loan product includes means for calculating a first price at which a secondary market purchaser will purchase the at least one customized loan product, and means for calculating a second price based on the first price for presentation to the borrower.

19. The system of claim 18, wherein the means for calculating the first price includes means for retrieving a required yield from a source of current pricing for conventional loans, and means for calculating adjustments to the required yield associated with the features of the at least one customized loan product.

20. The system of claim 19, wherein the means for calculating adjustments to the required yield includes means for applying the features of the at least one customized loan product to a set of rules for determining the price adjustments.

21. The system of claim 18, wherein the means for calculating the second price includes means for adjusting the first price to reflect a lender add-on.

22. The system of claim 17, wherein the features of the at least one customized loan recommendation include loan collateral maintenance.

23. The system of claim 22, wherein the loan collateral maintenance feature is a managed home maintenance plan.

24. The system of claim 17, wherein the features of the at least one customized loan recommendation include payment coverage for a missed loan payment, the payment coverage being configured such that the loan payment may be missed by the borrower without adverse impact on the borrower's credit history.

25. The system of claim 17, wherein the user is the borrower, and wherein the global computer network is the Internet.

26. The system of claim 17, wherein the loan requirements of the borrower include at least one of specific loan product features desired by the borrower and financial goals of the borrower.

27. The system of claim 17, further comprising means for revising the loan requirements of the borrower and means for determining at least one new customized loan product having features based on the revised loan requirements if the at least one customized loan product based on the borrower's previous loan requirements is not selected by the borrower.

28. The system of claim 17, further comprising means for processing an application for a customized loan product selected by the borrower.

29. The system of claim 28, further comprising means for obtaining a commitment from the secondary market purchaser to purchase the customized loan.

30. The system of claim 29, further comprising means for closing the customized loan and means for selling the customized loan to the secondary market purchaser.

31. The system of claim 17, wherein the means for determining at least one loan product includes a matrix of all possible combinations of the input loan requirements and the loan features.

* * * * *